United States Patent
Mashima et al.

(10) Patent No.: US 9,292,706 B2
(45) Date of Patent: Mar. 22, 2016

(54) CUSTOMER DATA MANAGEMENT FOR DATA ANALYTICS OUTSOURCING

(71) Applicant: FUJITSU LIMITED, Kawasaki-shi, Kanagawa (JP)

(72) Inventors: Daisuke Mashima, Sunnyvale, CA (US); Wei-Peng Chen, Fremont, CA (US)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/466,814

(22) Filed: Aug. 22, 2014

(65) Prior Publication Data

US 2016/0055349 A1   Feb. 25, 2016

(51) Int. Cl.
*H04L 9/00* (2006.01)
*H04L 9/32* (2006.01)
*G06F 21/62* (2013.01)
*G06F 17/30* (2006.01)
*H04L 29/06* (2006.01)

(52) U.S. Cl.
CPC ...... *G06F 21/6245* (2013.01); *G06F 17/30864* (2013.01); *H04L 63/20* (2013.01)

(58) Field of Classification Search
CPC .. G06Q 20/383; G06Q 20/0855; H04L 63/20; H04L 63/205; H04L 63/08; H04L 63/10; H04L 63/101; G06F 21/31; G06F 21/6245; G06F 17/30864
USPC .............. 726/1–6, 27–30; 713/168, 170, 182; 705/74, 78, 54
See application file for complete search history.

(56) References Cited

U.S. PATENT DOCUMENTS

| | | | |
|---|---|---|---|
| 8,042,193 B1* | 10/2011 | Piliouras | 726/28 |
| 8,364,969 B2* | 1/2013 | King | 713/182 |
| 8,650,403 B2* | 2/2014 | Canard et al. | 713/176 |
| 8,762,741 B2* | 6/2014 | Chase et al. | 713/193 |
| 2009/0171982 A1* | 7/2009 | Hagan et al. | 707/10 |
| 2013/0117126 A1 | 5/2013 | Coppinger | |
| 2013/0179991 A1 | 7/2013 | White et al. | |

FOREIGN PATENT DOCUMENTS

WO   2011/048619 A1   4/2011

OTHER PUBLICATIONS

European Search Report dated Oct. 2, 2015 as received in Application No. 15165087.6.

* cited by examiner

*Primary Examiner* — Hosuk Song
(74) *Attorney, Agent, or Firm* — Maschoff Brennan

(57) ABSTRACT

A method of customer data management in data analytics outsourcing includes communicating to a third party service provider an anonymous customer identifier (customer ID) that is uniquely associated with a customer. The method includes receiving from the third party service provider a customer data query that references the customer using the customer ID and requests customer data. The method includes determining whether an access control policy allows disclosure of customer data requested in the customer data query. In response to the access control policy allowing disclosure of the requested customer data, the method includes accessing the requested customer data and communicating the requested customer data to the third party service provider. In response to the access control policy prohibiting disclosure of the requested customer data, the method includes denying the customer data query.

20 Claims, 5 Drawing Sheets

CUSTOMER DATA MANAGEMENT FOR DATA ANALYTICS OUTSOURCING

FIELD

The embodiments discussed herein are related to customer data management for data analytics outsourcing.

BACKGROUND

Data controllers often outsource data analytics pertaining to data subjects. Generally, data controllers may outsource data analytics to a data processor. For example, utility companies often outsource data analytics related to energy usage of customers. For example, utility companies may outsource customer behavior analytics and predictive analytics of energy usage. Third party data analytics service providers (third parties) may be hired by the utility companies to calculate or otherwise determine the data analytics and return data analytics results to the utility companies and/or the customers to whom the data analytics pertain. To enable calculation of the data analytics, the utility companies may provide customer data to the third party service providers. Provision of the customer data may introduce privacy issues to the customers.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of customer data management may include communicating to a third party service provider (third party) an anonymous customer identifier (customer ID) that is uniquely associated with a customer. The method may include receiving from the third party a customer data query that references the customer using the customer ID and requests customer data. The method may include determining whether an access control policy allows disclosure of the customer data requested in the customer data query. In response to the access control policy allowing disclosure of the requested customer data, the method may include accessing the requested customer data and communicating the requested customer data to the third party. In response to the access control policy prohibiting disclosure of the requested customer data, the method may include denying the customer data query.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
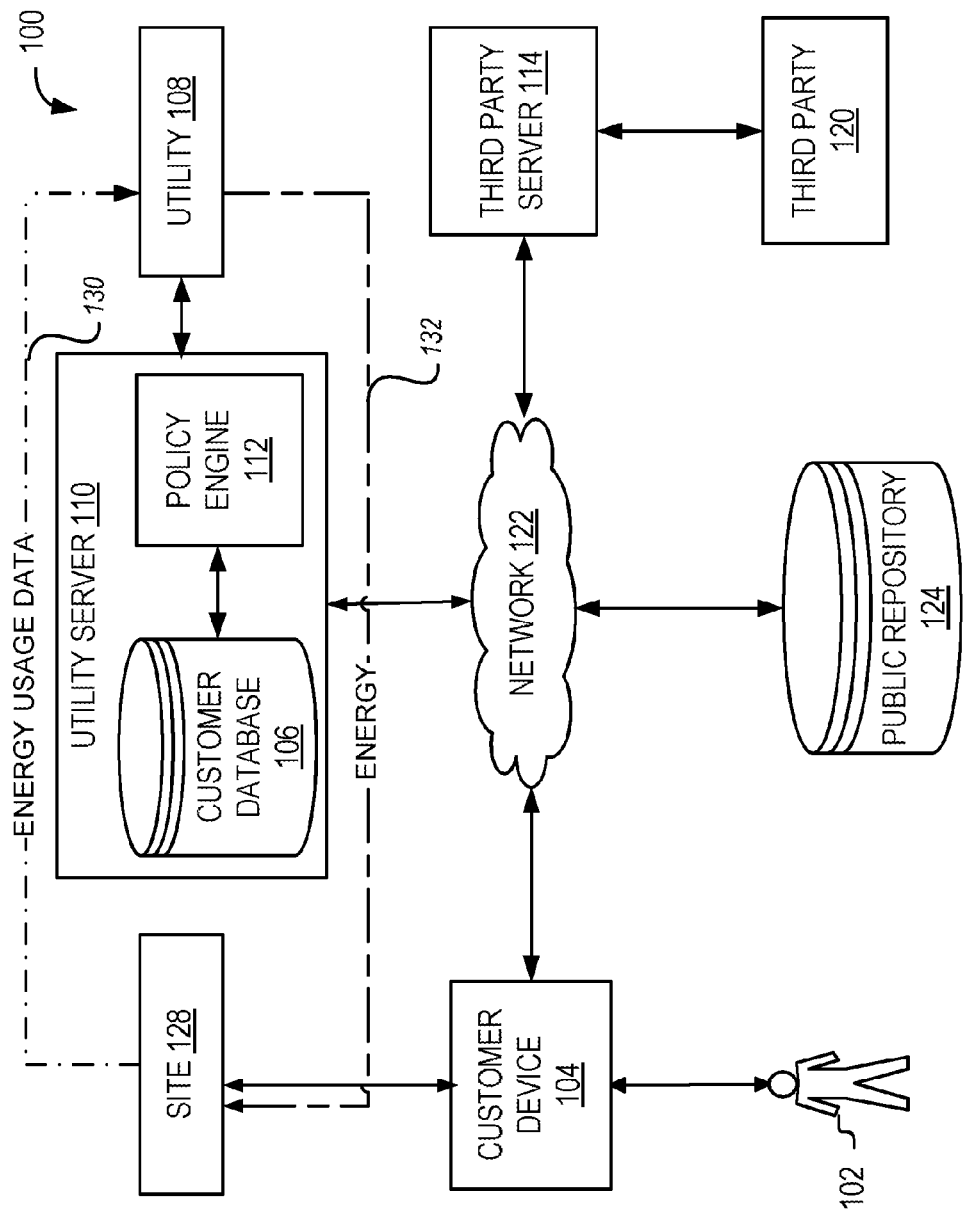
FIGS. 1A and 1B illustrate block diagrams of an example resource supply system in which some embodiments described herein may be implemented.

Utility companies (utilities or utility) may outsource data processing and data analytics to third party service providers (third party). The third party may be hired by the utility to calculate or otherwise determine the data analytics. For example, a utility may hire the third party to analyze energy usage of a customer. The utility may then use an analysis returned by the third party in demand response events.

To enable the third party to calculate the data analytics, the utility may provide customer data to the third party. Provision of the customer data may occur in context of a specific query communicated to the utility by the third party. The provision of the customer data may introduce privacy issues to the customers. The privacy issues may arise when the utility provides to the third parties data in excess of what is specifically involved in the data analytics. For example, providing an entire address when only a zip code is necessary may introduce a privacy issue. Moreover, the privacy issues may arise when the utility provides to the third parties data that may be used to access additional customer data. For example, with a customer name and address, the third party may access information regarding details of the dwelling associated with the customer or a value of the dwelling.

Accordingly, some embodiments described herein relate to managing customer data communicated to the third party. Management of the customer data may be dictated by an access control policy (policy), which may be created for one or more customers, one or more particular types of data, one or more third parties, or any combination thereof. For example, some embodiments described herein may minimize customer data provided to a particular third party based on the data analytics performed by the particular third party. Additionally, in some embodiments the utility may evaluate each customer data request submitted by the third party and determine whether, in the aggregate, the customer data provided to the third party introduces a privacy issue.

An example embodiment includes a method of customer data management. The method may be implemented in data analytics outsourcing. For instance, a utility may implement the method or an entity associated with the utility may implement the method to provide customer data that may be used to forecast energy curtailment potential of a customer. In the method, the third party and the utility may refer to a customer using an anonymous customer identifier (customer ID). The customer ID may be uniquely associated with the customer and may not include any information from which the third party is able to ascertain an identity of the customer. The customer ID may be shared between the utility and the third party.

When the third party is tasked with performing some data analytics including the customer, the utility may receive from the third party a customer data query. The customer data query may reference the customer using the customer ID. The customer data query may request customer data. The utility may determine whether a policy associated with the customer allows disclosure of customer data requested in the customer data query.

In response to the policy allowing disclosure of the requested customer data, the requested customer data may be accessed and communicated to the third party. In response to the policy prohibiting disclosure of the requested customer data, the query may be denied.

For example, the requested customer data may include basic customer data, which may include data locally stored or controlled by the utility and/or data defined by the policy as basic customer data. The policy may allow disclosure of the basic customer data. Accordingly, the utility may communicate the requested customer data to the third party. This and other embodiments are described with reference to the appended drawings.

FIG. 1A illustrates a block diagram of an example resource supply system 100. Generally, the resource supply system 100 is configured such that customer data may be communicated from a utility 108 to a third party 120 while preserving privacy of a customer 102. For example, the customer data may include energy usage data which may present privacy concerns to the customer 102 because behaviors of the customer 102 may be derived from the energy usage data. Additionally or alternatively, the customer data may include demographic data such as an address of a site 128 associated with the customer 102, a zip code of the site 128, a square footage measurement of the site 128, a name of the customer 102, a familial composition of the customer 102, etc. These and other customer data may be improperly used by the third party 120, which may introduce privacy concerns to the customer 102.

In the resource supply system 100 of FIG. 1A, the utility 108 may distribute electricity to the site 128. Accordingly, data communicated in the resource supply system 100 may include energy usage data. In some embodiments, the utility 108 may provide another resource such as natural gas or water to the site 128. Thus, in these embodiments, the data communicated may include other types of data related to the resource. Moreover, some embodiments may be applicable in other systems or environments. For example, similar processes to those discussed herein may be used for privacy preservation in environments in which there is sensitive data that is shared such as health care systems, insurance systems, and the like. The embodiments depicted herein are discussed in the context of the utility 108, the customer 102, and the third party 120. Other embodiments may include a data controller, an example of which is the utility 108; a data processor, an example of which is the third party 120; and a data subject, an example of which is the customer 102. In embodiments including the data subject may include a subject ID that may be substantially similar to the customer ID.

The resource supply system 100 depicted in FIG. 1A may include the utility 108, the third party 120, the site 128, a public repository (hereinafter "repository") 124, and the customer 102. The utility 108 may be associated with a utility server 110, the customer 102 may be associated with the site 128 and a customer device 104, and the third party 120 may be associated with a third party server 114. The term "associated with," when used herein to refer to a relationship between an entity (e.g., the third party 120 and the utility 108) and a server (e.g., the third party server 114 or the utility server 110) or between the customer 102 and the site 128 and the customer device 104, may indicate that the entity and/or the customer 102 owns or otherwise controls, directly or indirectly, the server (110 or 114) or the site 128 and the customer device 104. For example, the third party server 114 may be controlled by the third party 120 and the site 128 and the customer device 104 may be controlled by the customer 102. Data and information communicated from the server or the site 128 and the customer device 104 may be attributed to the entity associated therewith. Additionally, data and information communicated to the server or the site 128 and the customer device 104 may be intended for the entity associated therewith.

In the resource supply system 100, data including customer data requests, customer input, data analytics requests, and customer data may be communicated between the utility server 110, the third party server 114, the repository 124, and the customer device 104 via a network 122. The network 122 may be wired or wireless, and may have numerous configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may be a peer-to-peer network. The network 122 may also be coupled to or include portions of a telecommunications network that may enable communication of data in a variety of different communication protocols. In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

In the resource supply system 100, the utility 108 may distribute electricity, which may also be referred to herein and in FIG. 1A as energy, to the site 128. The distribution of the energy by the utility 108 to the site 128 is denoted in FIG. 1A at 132. Additionally, the utility 108 may collect energy usage data from the site 128. The collection of energy usage data is denoted in FIG. 1A at 130. The utility 108 may include any entity involved in production, transmission, and/or distribution of electricity. The utility 108 may be publicly owned or may be privately owned. Some examples of the utility 108 may include a power plant, an energy cooperative, and an independent system operator (ISO).

The site 128 may include buildings, structures, equipment, or other objects that use electricity distributed by the utility 108. The site 128 may have adapted thereto a meter (not shown) such as a smart meter that measures the energy distributed to the site 128. The meter may communicate the energy usage data to the utility 108. In some embodiments, energy usage data may be communicated to the utility 108 via the network 122. Based on the energy usage data, the utility 108 may ascertain the energy usage of the site 128, which may be used to bill the customer 102, for example.

The repository 124 may include any storage device or storage server that may be capable of communication via the network 122. The repository 124 may include memory and a processor. The repository 124 may host or otherwise store external customer data. Generally, external customer data may include data or information pertaining to the customer 102 that is not stored or directly controlled by the utility 108. The external customer data may be accessible at the repository 124 by providing some basic customer data to the repository 124. For example, the external customer data may include a square footage of the site 128. The utility 108 may provide to the repository 124 an address, which may be basic customer data controlled by and/or stored at the utility server 110 and/or defined by a policy to be basic customer data, to access the square footage.

The repository 124 may be a public repository maintained by a governmental body in some embodiments. Additionally or alternatively, the repository 124 may be privately owned or operated.

The customer 102 may include an individual or another entity such as a business entity, for example. The site 128 and the customer device 104 may be associated with the customer 102. In some embodiments, the customer 102 may communicate input effective to select one or more rules of the policy using the customer device 104. Additionally, the customer 102 may initiate a data analytics request, which may be communicated to the utility 108 and/or the third party server 114.

The customer device 104 may include a computing device that includes a processor, memory, and network communication capabilities. For example, the customer device 104 may include a laptop computer, a desktop computer, a tablet computer, a mobile telephone, a personal digital assistant (PDA), a smartphone, a mobile e-mail device, a portable game player, a portable music player, a television with one or more processors embedded therein or coupled thereto, or other electronic device capable of accessing the network 122.

The customer device 104 may be used to provide the input effective to select one or more rules to an access control policy engine (policy engine) 112. For example, the customer 102 may interface with the utility server 110 using the customer device 104 and may communicate one or more rules to the policy engine 112. Additionally or alternatively, the customer 102 may select a privacy level, which may in turn define one or more rules in the policy engine 112. The customer 102 may indicate, using the customer device 104, a preference to allow disclosure or prohibit disclosure of one or more data items included in the customer data. In some embodiments, the input may override a default access control policy of the utility 108.

Some examples of rules that may be defined in the policy at least in part by the input may include a scope of authorization of the third party 120, disclosure of no or an absolute minimum amount of customer data, a granularity level of data (e.g., energy usage data), disclosure of all customer data, selection of one or more third parties (e.g., 120) with which disclosure of certain customer data is authorized, or any other suitable rules or preferences that may be included in the policy engine 112. In some embodiments, the customer device 104 may interface with the utility server 110 via a browser-based interface. In other embodiments, the customer device 104 may include a module that is configured to interface with the utility server 110 and/or the third party server 114.

The utility server 110 associated with the utility 108 may include a hardware server that includes a processor, a memory, and network communication capabilities. In the illustrated embodiment, the utility server 110 may be coupled to the network 122 to send and receive data to and from the customer device 104, the repository 124, and the third party server 114 via the network 122.

The utility server 110 may include the policy engine 112. The policy engine 112 may include code and routines for managing customer data. In some embodiments, the policy engine 112 may act in part as a thin-client application that may be stored on a computing device (e.g., the customer device 104) and in part as components that may be stored on the utility server 110, for instance. In some embodiments, the policy engine 112 may be implemented using hardware including a field-programmable gate array (FPGA) or an application-specific integrated circuit (ASIC). In some other instances, the policy engine 112 may be implemented using a combination of hardware and software. The policy engine 112 may be employed in behind the firewall of the utility server 110 in some embodiments (e.g., in a demilitarized zone (DMZ)).

The policy engine 112 may be configured to manage customer data in data analytics outsourcing. For example, the policy engine 112 may communicate to the third party 120 a customer ID. The customer ID may be uniquely associated with the customer 102. In some embodiments, the customer ID may be shared between the utility 108 and the third party 120. Additionally, the customer ID may be changed periodically from the customer ID to an updated customer ID. After a change to the customer ID, the updated customer ID may not be linked to the customer ID. By changing the customer ID, it may be more difficult for a malicious entity to discover information about the customer 102.

The policy engine 112 may then receive from the third party 120 a customer data query. The third party 120 may communicate the customer data query using the third party server 114 via the network 122. The customer data query may reference the customer 102 using the customer ID. Additionally, the customer data query may further include a request for customer data pertaining to the customer 102. For example, the customer data query may include a request for a zip code of the site 128. The address may be used in data analytics performed by the third party 120 for the utility 108.

The policy engine 112 may then determine whether a policy allows disclosure of the customer data requested in the customer data query. The policy may be associated with the customer 102, may be associated with the third party 120, may be associated with the type of data analytics performed by the third party 120, may be associated with a requested data analytics, or some combination thereof. The policy may be extensible such that rules may be added and determinations regarding disclosure may be based at least partially on customer data that has been previously communicated. Accordingly, the policy engine 112 may base the management on the particular data analytics performed by the third party 120 and/or input from the customer 102, for example.

In response to the policy allowing disclosure of the requested customer data, the policy engine 112 may access the requested customer data. In some embodiments, the utility server 110 may include a customer database 106. The customer database 106 may be employed behind a firewall of the utility 108 and/or on an intranet of the utility 108, for instance.

The customer database 106 may be implemented to store the basic customer data. The basic customer data may include information pertaining to the customer 102 that is stored and/or controlled by the utility 108. To access the basic customer data, the policy engine 112 may retrieve the basic customer data from the customer database 106.

Additionally, the policy engine 112 may access external customer data from the repository 124. For example, the policy engine 112 may access the basic customer data from the customer database 106 and provide it to the repository 124. In response, the repository 124 may supply to the policy engine 112 the external customer data. In some embodiments, the third party 120 may provide instructions that provide direction to the repository 124 and/or basic customer data involved in obtaining the external customer data. The policy engine 112 may communicate the requested customer data, which may include basic customer data and/or external customer data, to the third party 120 and/or the third party server 114. In response to the policy prohibiting disclosure of the requested customer data, the policy engine 112 may deny the query.

In some embodiments, the policy engine 112 may be implemented using an extended Green Button Connect My Data (GBCMD) framework or an extended OpenADE. In these and other embodiments, the customer 102 may securely establish an association between the third party 120 and the utility 108, for example using open standard for authorization (OAuth or OAuth 2.0), and may communicate input related to the policy. GBCMD may also allow the third party 120 to specify scope for each customer data query. Moreover, using the extended GBCMD, the third party 120 may provide instructions in the customer data query. Some additional details of the instructions are provided elsewhere herein.

Additionally or alternatively, the utility 108 may implement the policy engine 112 as a gateway for sharing information with the third party 120. For example, based on a predetermined policy between the utility 108 and the third party 120, a gateway module may be deployed in a premise of the utility 108 to enable the sharing of the customer data.

The gateway module may be substantially static once deployed. Accordingly, detailed schema of data to be shared may be rigorously defined in advance. Additionally, when the rules of the policy are changed, the utility 108 may develop an updated code and review process to ensure an updated gateway module is complying with updated rules. In some embodiments employing a gateway module, multiple gateway modules may be deployed. For example, one or more third parties (e.g., 120) may have a particular gateway module through which customer data is communicated. In addition, while the gateway module may be static after deployment, one or more of the functionalities of the policy engine 112 may be extensible through support of instructions provided by the third parties 120.

An example of a circumstance in which embodiments described herein may be used includes preparation for one or more demand response (DR) events. The utility 108 may be interested in issuing a DR event. In advance of the DR events, the utility 108 may hire the third party 120 to determine whether the customer 102 and/or the site 128 is a good candidate (e.g., have sufficient energy usage flexibility) for the DR events. To conduct an analysis of the customer 102, the third party 120 may communicate a customer data query to the utility server 110. As described herein, the policy engine 112 may communicate a minimum amount of customer data (e.g., energy usage data, zip code, square footage, etc.) to the third party 120. The third party 120 may determine that the customer 102 makes a good candidate and communicate results indicating such to the utility server 110. Depending on the DR program utilized between the customer 102 and the utility 108, based on the results, the utility 108 may communicate a DR participation request or notification to the customer device 104. The customer 102 may choose to or be obligated to participate in the DR event and accordingly curtail energy usage at the site 128 (e.g., delay a process, turn off an air conditioner, turn off a dryer, etc.). Additionally or alternatively, the utility 108 may curtail energy usage at the site 128.

Modifications, additions, or omissions may be made to the resource supply system 100 without departing from the scope of the present disclosure. Specifically, embodiments depicted in FIG. 1A include one customer 102, one customer device 104, one repository 124, one site 128, one utility 108, one utility server 110, one third party 120, and one third party server 114. However, the present disclosure applies to resource supply systems that may include one or more of the customers 102, one or more of the customer devices 104, one or more of the repositories 124, one or more of the sites 128, one or more of the utilities 108, one or more of the utility servers 110, one or more of the third parties 120, one or more of the third party servers 114, or any combination thereof. The present disclosure may also apply to resource supply systems involving any other resource.

Moreover, the separation of various components in the embodiments described herein is not meant to indicate that the separation occurs in all embodiments. It may be understood with the benefit of this disclosure that the described components may be integrated together in a single component or separated into multiple components.

In the resource supply system 100, memory such as memory in the customer device 104, the utility server 110, the repository 124, and the third party server 114 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 1B:
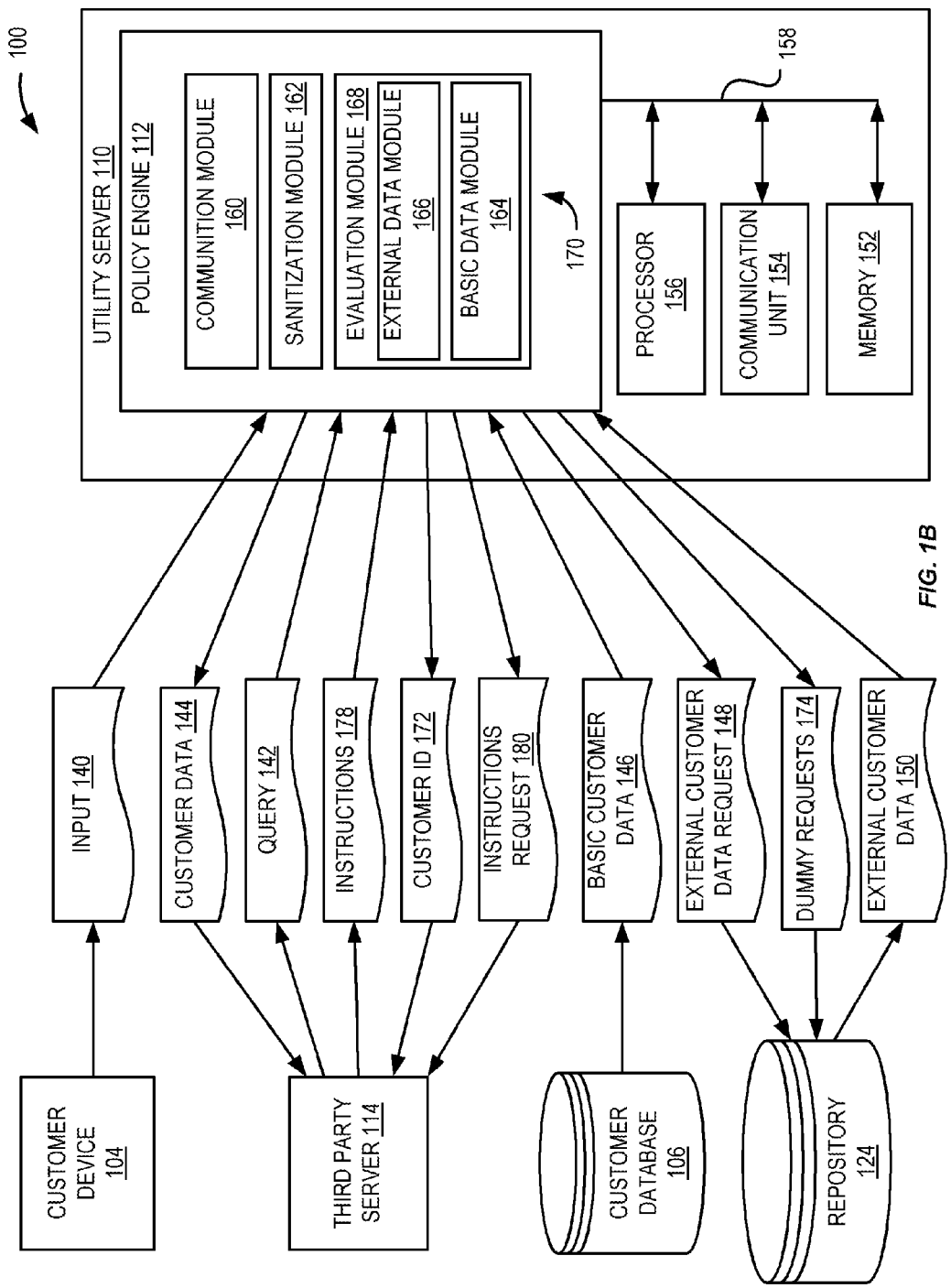

FIG. 1B illustrates another block diagram of the resource supply system 100 described with reference to FIG. 1A. The resource supply system 100 includes an example of the policy engine 112. The resource supply system 100 of FIG. 1B may include one or more components (e.g., the customer device 104, the third party server 114, the customer database 106, and the repository 124) described with reference to FIG. 1A. An example of the policy engine 112 is shown in more detail in FIG. 1B. Although not depicted in FIG. 1B, communications between the customer device 104, the third party server 114, the repository 124, and the utility server 110 may be via the network 122 discussed with reference to FIG. 1A.

Additionally, the customer database 106 is depicted in FIG. 1B external to the utility server 110. In embodiments in which the customer database 106 is external to the utility server 110, communication between the utility server 110 and the customer database 106 may be via the network 122. Additionally or alternatively, the communication between the utility server 110 and the customer database 106 may be via a private portion of the network 122 or a non-Internet network. In some embodiments, the customer database 106 may be included in the utility server 110. In these and other embodiments, the communications may be via the network 122 or another suitable structure such as a bus 158, some details of which are provided below.

The utility server 110 of FIG. 1B may include the policy engine 112, a processor 156, a memory 152, and a communication unit 154. The components of the utility server 110 may be communicatively coupled by the bus 158.

The processor 156 may include an arithmetic logic unit (ALU), a microprocessor, a general-purpose controller, or some other processor array to manage customer data. The processor 156 may be coupled to the bus 158 for communication with the other components (e.g., 112, 154, and 152). The processor 156 generally processes data signals and may include various computing architectures including a complex instruction set computer (CISC) architecture, a reduced instruction set computer (RISC) architecture, or an architecture implementing a combination of instruction sets. Although FIG. 1B includes a single processor 156, multiple processors may be included in the utility server 110. Other processors, operating systems, and physical configurations may be possible.

The memory 152 may be configured to store instructions and/or data that may be executed by the processor 156. The memory 152 may be coupled to the bus 158 for communication with the other components. The instructions and/or data may include code for performing the techniques or methods described herein. The memory 152 may include a DRAM device, an SRAM device, flash memory, or some other memory device. In some embodiments, the memory 152 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 154 may be configured to transmit and receive data to and from one or more of the customer device 104, the repository 124, the customer database 106, and the third party server 114. The communication unit 154 may be coupled to the bus 158. In some embodiments, the communication unit 154 includes a port for direct physical connection to the network 122 of FIG. 1A or to another communication channel. For example, the communication unit 154 may include a USB, SD, CAT-5, or similar port for wired communication with the components of the resource supply system 100. In some embodiments, the communication unit 154 includes a wireless transceiver for exchanging data via communication channels using one or more wireless communication methods, including IEEE 802.11, IEEE 802.16, BLUETOOTH®, or another suitable wireless communication method.

In some embodiments, the communication unit 154 includes a wired port and a wireless transceiver. The communication unit 154 may also provide other connections for distribution of files and/or media objects using standard network protocols including transmission control protocol/internet protocol (TCP/IP), HTTP, HTTP secure (HTTPS), and simple mail transfer protocol (SMTP), etc. In some embodiments, the communication unit 154 includes a cellular communications transceiver for sending and receiving data over a cellular communications network including via SMS, MMS, HTTP, direct data connection, WAP, e-mail, or another suitable type of electronic communication.

In the embodiment of FIG. 1B, the policy engine 112 may include a communication module 160, a sanitization module 162, an evaluation module 168, an external data module 166, and a basic data module 164 (collectively, policy modules 170). One or more of the policy modules 170 may be implemented as software including one or more routines configured to perform one or more operations. The policy modules 170 may include a set of instructions executable by the processor 156 to provide the functionality described herein. In some instances, the policy modules 170 may be stored in or at least temporarily loaded into the memory 152 and may be accessible and executable by the processor 156. One or more of the policy modules 170 may be adapted for cooperation and communication with the processor 156 and components of the utility server 110 via the bus 158.

The communication module 160 may be configured to handle communications between the policy engine 112 and other components of the utility server 110 (e.g., 156, 152, and 154). The communication module 160 may be configured to send data to and receive data from the customer device 104, the third party server 114, the repository 124, and the customer database 106 via the communication unit 154. In some instances, the communication module 160 may cooperate with the other modules (e.g., 162, 168, 166, and 164) to receive and/or forward, via the communication unit 154, data from the customer device 104, the third party server 114, the repository 124, and the customer database 106.

For example, the communication module 160 may be configured to communicate a customer ID 172 to the third party server 114. The customer ID 172 may be uniquely associated with a customer (e.g., the customer 102 of FIG. 1A) associated with the customer device 104. Additionally or alternatively, the communication module 160 may be configured to receive input 140 from the customer device 104. The input 140 may be effective to select one or more rules of the policy that dictates access by third parties to customer data 144. The input 140 may override a default policy of a utility and/or the input 140 may define a scope of authorization of a third party associated with the third party server 114.

The communication module 160 may be configured to receive from the third party server 114 a customer data query 142 (query 142 in FIG. 1B). The customer data query 142 may reference the customer associated with the customer device 104 using the customer ID 172. Additionally, the customer data query 142 may request one or more pieces of customer data pertaining to the customer. For example, in some embodiments, the customer data query 142 may include multiple pieces of customer data all of which are requested in one customer data query 142 and/or may be split into multiple data queries, each requesting a portion of the total customer data.

The customer data query 142 may be communicated to the evaluation module 168. The evaluation module 168 may be configured to authenticate the third party server 114. The third party server 114 and/or the third party associated with the third party server 114 may be authenticated in any suitable fashion in which sufficient information is communicated between the evaluation module 168 and the third party server 114 to identify the third party. For example, the service provider may be authenticated based on success of a transport layer security (TLS) communication and/or based on verification of a user identifier (user ID) and password. The authentication of the third party server 114 may be an initial step in ensuring that the customer data 144 is not inadvertently communicated to an unauthorized third party. If the third party server 114 fails the authentication, the evaluation module 168 may deny the query.

If, however, the evaluation module 168 authenticates the third party server 114, the evaluation module 168 may be configured to determine whether a policy allows disclosure of the customer data 144 requested in the customer data query 142. In general, in response to the policy allowing disclosure of the requested customer data, the evaluation module 168 may access the requested customer data. The customer data 144 may then be communicated to the third party server 114 by the communication module 160 via the communication unit 154. Additionally, in response to the policy prohibiting disclosure of the requested customer data, the evaluation module 168 may deny the query. In some embodiments, along with denying the query, the evaluation module 168 may communicate a deficiency message indicating a reason for denying the query and/or an instructions request 180 indicating that the evaluation module 168 cannot find the requested customer data.

The third party server 114 may receive the customer data 144, perform analytics based thereon, and communicate results (not shown) to the utility server 110 and/or the customer device 104.

In some embodiments, the evaluation module 168 may additionally be configured to record the customer data 144 communicated to the third party server 114 as well as other third party servers similar to the third party server 114. Prior to communicating the requested customer data, the evaluation module 168 may evaluate whether, in the aggregate, the customer data 144 communicated to the third party server 114 and/or the requested customer data introduces a privacy issue to the customer. In response to the customer data, in the aggregate, introducing a privacy issue to the customer, the evaluation module 168 may deny the query. Otherwise, the customer data 144 may be communicated to the third party server 114.

In the embodiment depicted in FIG. 1B, the evaluation module 168 may include the basic data module 164 and the external data module 166. The basic data module 164 may be configured to manage requests for basic customer data 146. The basic customer data 146 may include any data or information stored in a database such as the customer database 106. The basic customer data 146 may be easily accessed by the utility server 110 and may exist behind a firewall of a utility associated with the utility server 110. Some examples of basic customer data may include a zip code of a site (e.g., site 128), a city, and meter readings having a relatively large granularity (e.g., 15-min or 1-hour).

In some embodiments, the basic data module 164 may be configured to determine whether disclosure of the basic customer data 146 is allowed by the policy. In response to the disclosure of the basic customer data 146 not being allowed by the policy, the basic data module 164 may deny the query. For example, if the customer does not want any customer data disclosed, the query requesting the basic customer data 146 may be denied by the basic data module 164.

In response to the disclosure of basic customer data being allowed by the policy, the basic data module 164 may determine whether the requested customer data includes only basic customer data. In response to the requested customer data including only basic customer data, the basic data module 164 may access the basic customer data 146 from the customer database 106. The basic customer data 146 may then be communicated to the third party server 114. In response to the requested customer data including data other than the basic customer data, the basic data module 164 may communicate the customer data query to the external data module 166.

Generally, the external data module 166 may be configured to manage requests for external customer data 150. The external customer data 150 may include any data or information that is not in the customer database 106. The external customer data 150 may accordingly be stored and/or accessible at the repository 124.

In some embodiments, when the customer data query 142 includes a request for the external customer data 150, the third party server 114 may communicate instructions 178 to the policy engine 112. Additionally or alternatively, the evaluation module 168 may communicate the instructions request 180 to the third party server 114. The instructions 178 may include directions that may be implemented by the policy engine 112 to access the external customer data 150 from the repository 124. For example, the instructions 178 may include an indication of the external customer data 150 that is requested, query data items used when querying the repository 124, a location such as a uniform resource locator (URL) address of the repository 124, a query template, other query parameters, or some combination thereof.

A potential vulnerability may include leading the utility server 110 to a malicious site. To mitigate this potential vulnerability, the external data module 166 may determine whether the repository 124 included in the instructions 178 is approved. For example, the external data module 166 may determine whether a link such as the URL address in the instructions is approved. The external data module 166 may include a whitelist and a blacklist of URL addresses. The external data module 166 may compare the URL address to the whitelist and the blacklist. The link may be approved if the URL address is not on the blacklist or if the URL address is on the whitelist, for instance. If the link is not approved, then the external data module 166 may deny the query.

In response to the link being approved, the external data module 166 may access the external customer data using the instructions and/or the basic customer data. For example, the external data module 166 may communicate an external customer data request 148 to the repository 124. The external customer data request 148 may be formatted according to the instructions and may include one or more basic customer data 146. The external customer data 150 may then be communicated to the third party server 114.

In some embodiments, a potential vulnerability may include a conspiracy via synchronizing between the third party server 114 and the repository 124. To mitigate this potential vulnerability, the external data module 166 may communicate one or more dummy requests 174 to the repository 124 along with the external customer data request 148. The dummy requests 174 may be communicated at random intervals to interrupt a synchrony between the repository 124 and the third party server 114.

In some embodiments, the policy engine 112 may include the sanitization module 162. The sanitization module 162 may be configured to sanitize the customer data 144 prior to communicating the customer data 144 to the third party server 114. Generally, sanitizing the customer data 144 may include removing data that may introduce privacy issues to the customer. Accordingly, the sanitization module 162 may alter the customer data 144 to obscure or remove at least a portion of the customer data 144. For example, the sanitization module 162 may alter a granularity of the customer data 144 (e.g., meter readings), redact the basic customer data 146 from the external customer data 150, and may parse the external customer data 150 and extract only data items involved in analytics performed by the third party.

A first example of customer data communication using the policy engine 112 may include disclosure of a coarse address. The coarse address may include a zip code, a city name, or a county name, for instance. The third party server 114 may communicate the customer data query 142 requesting the coarse address. The coarse address may be characterized as the basic customer data 146. Accordingly, the basic data module 164 may access the coarse address and communicate it as the customer data 144 to the third party server 114 if the policy allows.

A second example of customer data communication using the policy engine 112 may include disclosure of a square footage of an address of a site. The third party server 114 may communicate the customer data query 142 requesting the square footage. The square footage may be characterized as the external customer data 150 and may be based on the address. Disclosure of the address in this example may be prohibited by the policy. Accordingly, the external data module 166 may access the square footage from the repository 124 using the address. Thus, the third party server 114 may not have access to the address while the external data module 166 accesses the square footage from the repository 124. The external data module 166 may then communicate the square footage accessed from the repository 124 as the customer data 144 to the third party server 114. Additionally, the sanitation module 162 may sanitize the square footage to ensure the address or some echo thereof is not inadvertently communicated to the third party server 114.

A third example of customer data communication using the policy engine 112 may include disclosure of energy consumption data for two or more customers in a particular neighborhood (neighborhood energy data). The third party server 114 may communicate the customer data query 142 requesting the neighborhood energy data. In response, the policy engine 112 may preprocess a comparison of the neighborhood energy data or communicate the neighborhood energy data without disclosing detailed address information of the customers in a neighborhood.

A fourth example of customer data communication using the policy engine 112 may include disclosure of an exact address. The third party server 114 may communicate the customer data query 142 requesting the exact address. The exact address may be characterized as the basic customer data 146; however, the policy may prohibit disclosure. Accordingly, no customer data may be communicated to the third party server 114 or the utility server 110 may include a specific form or granularity (e.g., a coarse address) that the policy engine 112 may communicate under the policy.

A fifth example of customer data communication using the policy engine 112 may include disclosure of energy usage data. The third party server 114 may communicate the customer data query 142 requesting the energy usage data. The energy usage data may be characterized as the basic customer data 146; however, the policy may specify a granularity at which the energy usage data may be disclosed. Accordingly, the energy usage data may be communicated to the third party server 114 at the specified granularity.

A sixth example of customer data communication using the policy engine 112 may include disclosure of data related to energy usage forecasting (forecasting data). The forecasting data may include ambient data (e.g., temperature, humidity, etc.), historical energy usage data, and square footage. The ambient data may be characterized as external customer data. Accordingly, the third party server 114 may include instructions with how to access the ambient data from the repository 124. For example, the instructions may include "consult exampleweathersite.com by sending zip code of the site associated with customer." The policy engine 112 may access the external customer data 150 from the repository 124 using the instruction and basic customer data (e.g., the zip code). The historical energy usage data and the square footage may be communicated as described above. A single customer data query may include one or more data items of the customer data (e.g., the ambient data, the historical energy usage data, and the square footage). Additionally or alternatively, a series of customer data queries 142 may be communicated by the third party server 114.

Figure 2A:
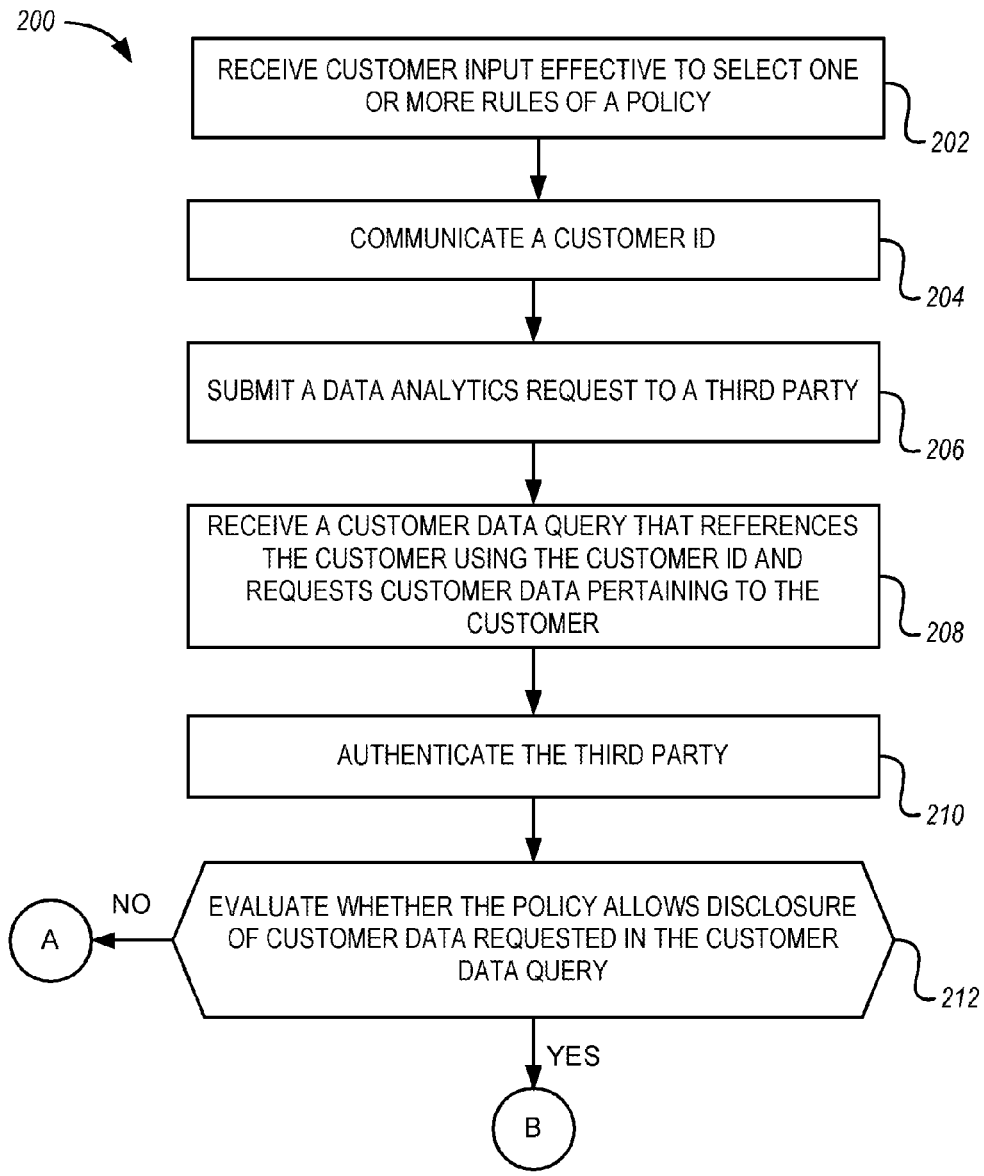
FIGS. 2A and 2B illustrate a flow diagram of an example method of customer data management.
Figure 2B:
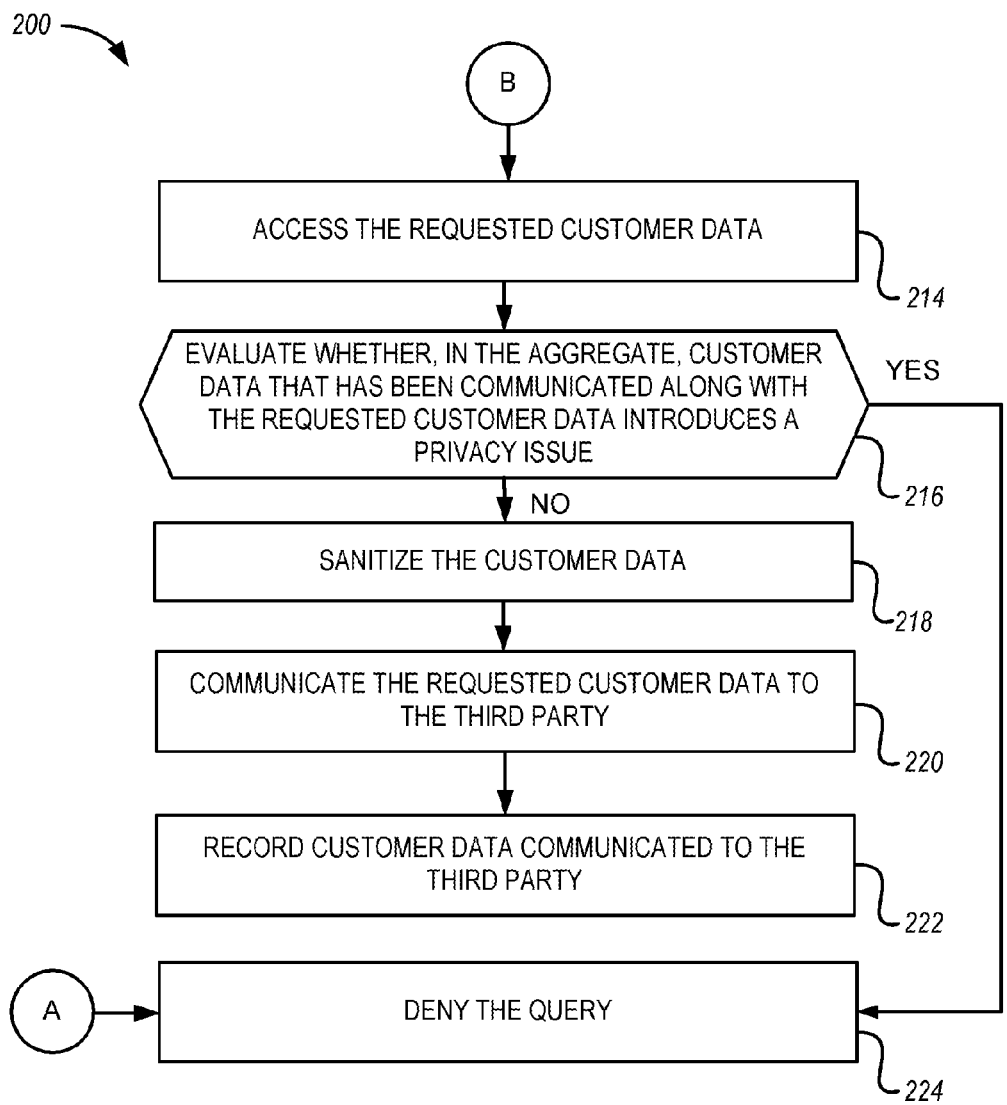

FIGS. 2A and 2B illustrate a flow diagram of an example method 200 of customer data management, which may be implemented in data analytics outsourcing, arranged in accordance with at least one embodiment described herein. The method 200 may be performed in a resource supply system such as in the resource supply system 100 of FIGS. 1A and 1B. The method 200 may be programmably performed in some embodiments by the utility server 110 described herein. The utility server 110 may include or may be communicatively coupled to a non-transitory computer-readable medium (e.g., the memory 152 of FIG. 1B) having stored thereon or encoded therein programming code or instructions that are executable by a processor to perform or control performance of the method 200. Additionally or alternatively, the utility server 110 may include a processor (e.g., the processor 156 of FIG. 1B) that is configured to execute computer instructions to perform or control performance of the method 200. Although illustrated as discrete blocks, various blocks may be divided into additional blocks, combined into fewer blocks, or eliminated, depending on the desired implementation.

Referring to FIG. 2A, the method 200 may begin at block 202. At block 202, customer input may be received. The customer input may be effective to select one or more rules of a policy. The customer input may be input through a customer device, such as the customer device 104 of FIG. 1A, and may be received through a communication unit of a utility server, such as the communication unit 154. At block 204, a customer ID may be communicated. The customer ID may be uniquely associated with a customer. The customer ID may be communicated to a third party server such as the third party server 114 using a communication unit such as the communication unit 154. The customer ID may make an identity of the customer anonymous to a third party. At block 206, a data analytics request may be submitted. The data analytics request may be submitted to a third party server such as the third party server 114 by a communication unit of a utility server, such as the communication unit 154. The data analytics request may be submitted to a third party. For example, a utility may be interested in forecasting the energy curtailment of the customer. Accordingly, the utility may submit a data analytics request to the third party for a forecast of the energy curtailment of the customer. In some embodiments, the data analytics request may be submitted only once, for example, during a service contract phase. Subsequently, analytics results may be communicated between the third party and the utility.

At block 208, a customer data query may be received. The customer data query may reference the customer using the customer ID and may request customer data pertaining to the customer. The requested customer data may further pertain to the requested data analytics. The customer data query may be received by a communication unit of a utility server such as the communication unit 154. The customer data query may be communicated from a third party server such as the third party server 114. At block 210, the third party may be authenticated. The third party may be authenticated in any suitable fashion that provides adequate support for the identity of the third party. For example, communication of the customer data query may occur at an application level. Accordingly, the third party may be authenticated based on success of a TLS communication. Another example of the authentication may include a verification of a user identifier (user ID) and password.

The third party may be authenticated by an evaluation module such as the evaluation module 168. At block 212, it may be determined whether a policy allows disclosure of the customer data requested in the customer data query. A determination of whether the policy allows disclosure may be made by an evaluation module of a utility server such as the evaluation module 168. From block 212, the method 200 may proceed to block 214 of FIG. 2B or the method 200 may proceed to block 222 of FIG. 2B. For example, in response to the policy allowing disclosure of the requested customer data ("Yes" at block 212), the method 200 may proceed to block 214. In response to the policy prohibiting disclosure of the requested customer data ("No" at block 212), the method 200 may proceed to block 224.

Referring to FIG. 2B, at block 214 the requested customer data may be accessed. For example, the requested customer data may be accessed at a customer database and/or a repository. The requested customer data may be accessed by an external data module of a utility server such as the external data module 166. At block 216, it may be evaluated whether, in the aggregate, customer data that has been communicated along with the requested customer data introduces a privacy issue. In response to the customer data introducing a privacy issue ("YES" at block 216), the method 200 may proceed to block 224. At block 224, the query may be denied. In some embodiments, denying the query may include communicating a deficiency message indicating a reason for denying the query. The query may be denied by an evaluation module of a utility server such as the evaluation module 168.

In response to the customer data not introducing a privacy issue ("NO" at block 216), the method may proceed to block 218. At block 218, customer data may be sanitized. For example, accessed external customer data and or basic customer data may be sanitized. Sanitizing customer data may include altering a granularity of the requested customer data, redacting basic customer data from the external customer data, parsing the external customer data, and extracting data items involved in analytics performed by the third party, or any combination thereof. The customer data may be sanitized by a sanitization module of a utility server such as the sanitization module 162. At block 220, the requested customer data may be communicated to the third party. The requested customer data may be communicated by a communication unit of a utility server such as the communication unit 154. At block 222, the customer data communicated to the third party may be recorded. The customer data communicated to the third party may be recorded in memory of a utility server such as the memory 152.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 3:
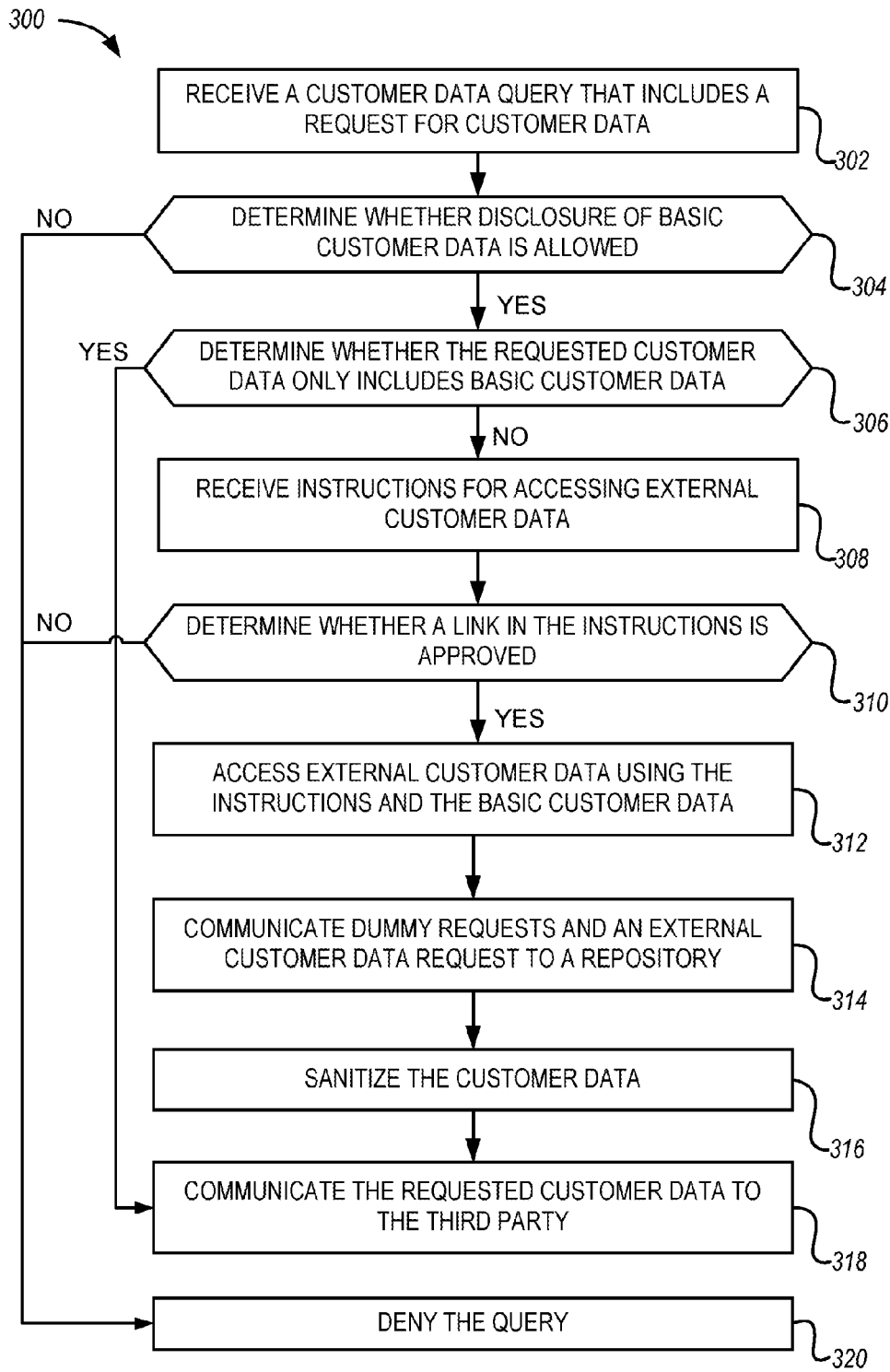
FIG. 3 illustrates a flow diagram of an example method of evaluating customer data requested in a customer data query.

FIG. 3 illustrates a flow diagram of an example method 300 of evaluating customer data requested in a customer data query, arranged in accordance with at least one embodiment described herein. The method 300 may be performed in a resource supply system such as in the resource supply system 100 of FIGS. 1A and 1B. The method 300 may be programmably performed in some embodiments by the utility server 110 described herein. The utility server 110 may include or may be communicatively coupled to a non-transitory computer-readable medium (e.g., the memory 152 of FIG. 1B) having stored thereon or encoded therein programming code or instructions that are executable by a processor to perform or control performance of the method 300. Additionally or alternatively, the utility server 110 may include a processor (e.g., the processor 156 of FIG. 1B) that is configured to execute computer instructions to perform or control performance of the method 300. Although illustrated as discrete blocks, various blocks may be divided into additional blocks, combined into fewer blocks, or eliminated, depending on the desired implementation.

The method 300 may begin at block 302. At block 302, a customer data query may be received. The customer data query may include a request for customer data. The customer data query may be received by a communication unit of a utility server such as the communication unit 154. At block 304, it may be determined whether disclosure of basic customer data is allowed. A determination of whether disclosure of the basic customer data is allowed may be made by an evaluation module of a utility server such as the evaluation module 168. In response to the disclosure of basic customer data being prohibited ("NO" at block 304), the method 300 may proceed to block 320. At block 320, the query may be denied. In response to the disclosure of basic customer data being allowed ("YES" at block 304), the method 300 may proceed to block 306.

At block 306, it may be determined whether the requested customer data only includes basic customer data. A determination of whether the requested customer data only includes basic customer data may be made by an evaluation module of a utility server such as the evaluation module 168. In response to the requested customer data only including basic customer data ("YES" at block 306), the method 300 may proceed to block 318. At block 318, the requested customer data may be communicated to the third party. The requested customer data may be communicated to a third party server such as the third party server 114 by a communication unit of a utility server such as the communication unit 154.

In response to the requested customer data including data other than basic customer data ("NO" at block 306), the method 300 may proceed to block 308. At block 308, instructions for accessing external customer data may be received. The instructions may be received by a communication unit of a utility server such as the communication unit 154.

At block 310, it may be determined whether a link in the instructions is approved. A determination of whether a link is approved may be performed by an external data module of a utility server such as the external data module 166. In some embodiments, the link may be compared to a list including whitelisted links and blacklisted links. In response to the link being one of the whitelisted links and/or not one of the blacklisted links, the link may be approved. In response to the link being one of the blacklisted links, the link may not be approved.

In response to the link not being approved ("No" at block 310), the method may proceed to block 320. At block 320, the query may be denied. The query may be denied by an evaluation module of a utility server such as the evaluation module 168. In response to the link being approved ("YES" at block 310), the method may proceed to block 312. At block 312, external customer data may be accessed using the instructions and one or more items of the basic customer data. The external customer data may be accessed by an external data module of a utility server such as the external data module 166. At block 314, dummy requests and external customer data requests may be communicated to a repository. The dummy requests may be generated and/or communicated by an external data module of a utility server such as the external data module 166.

At block 316, the requested customer data may be sanitized. For example, accessed external customer data and or basic customer data may be sanitized. Sanitizing customer data may include altering a granularity of the requested customer data, redacting basic customer data from the external customer data, parsing the external customer data, and extracting data items involved in analytics performed by the third party, or any combination thereof. The customer data may be sanitized by a sanitization module of a utility server such as the sanitization module 162. The method 300 may then proceed to block 318, where the requested customer data may be communicated to the third party. The requested customer data may be communicated by a communication unit of a utility server such as the communication unit 154.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of customer data management, the method comprising:
    communicating, by one or more processors, to a third party service provider an anonymous customer identifier (customer ID) that is uniquely associated with a customer;
    receiving, by the one or more processors, from the third party service provider a customer data query that references the customer using the customer ID and requests customer data;
    determining, by the one or more processors, whether access control policy allows disclosure of the customer data requested in the customer data query; and
    in response to the access control policy allowing disclosure of the requested customer data, accessing, by the one or more processors, the requested customer data and communicating the requested customer data to the third party service provider.

2. The method of claim 1, further comprising receiving input from a customer device effective to select one or more rules of the access control policy, wherein:
    the input overrides a default access control policy, and
    the input defines a scope of authorization of the third party service provider.

3. The method of claim 1, further comprising authenticating the third party service provider based on one or more of success of transport layer security (TLS) communication and on verification of a user identifier (user ID) and password.

4. The method of claim 1, further comprising:
    recording customer data communicated to the service provider; and
    prior to communicating requested customer data, evaluating whether, in the aggregate, customer data communicated to the third party service provider along with the requested customer data introduces a privacy issue.

5. The method of claim 1, wherein the evaluating includes:
    determining whether disclosure of basic customer data is allowed by the access control policy;
    in response to the disclosure of basic customer data not being allowed by the access control policy, denying the query;
    in response to the disclosure of basic customer data being allowed by the access control policy, determining whether the requested customer data includes only basic customer data;
    in response to the requested customer data including only basic customer data, communicating the requested customer data to the service provider;
    in response to the requested customer data including data other than the basic customer data, receiving instructions for accessing external customer data;
    determining whether a link in the instructions is approved;
    in response to the link not being approved, denying the query; and
    in response to the link being approved, accessing the external customer data using the instructions and the basic customer data and communicating the requested customer data to the service provider.

6. The method of claim 5, further comprising sanitizing at least a portion of the accessed external customer data.

7. The method of claim 6, wherein the sanitizing includes one or more of:
    altering a granularity of the requested customer data;
    redacting basic customer data from the external customer data; and
    parsing the accessed external customer data and extracting only data items involved in analytics performed by the third party service provider for communication to the third party service provider.

8. The method of claim 5, wherein the determining whether the link is approved includes:
    comparing the link to a list that includes at least one of whitelisted links and blacklisted links; and
    in response to at least one of the link being one of the whitelisted links and/or not being one of the blacklisted links, approving the link.

9. The method of claim 5, wherein the accessing includes communicating one or more dummy requests and an external customer data request to a repository.

10. The method of claim 5, wherein the denying includes communicating a deficiency message to the third party service provider indicating a reason for denying the query.

11. A non-transitory computer-readable medium having encoded therein programming code executable by a processor to perform or control performance of operations comprising:
- communicating to a third party service provider an anonymous customer identifier (customer ID) that is uniquely associated with a customer;
- receiving from the third party service provider a customer data query that references the customer using the customer ID and requests customer data;
- determining whether access control policy allows disclosure of the customer data requested in the customer data query; and
- in response to the access control policy allowing disclosure of the requested customer data, accessing the requested customer data, and communicating the requested customer data to the third party service provider.

12. The non-transitory computer-readable medium of claim 11, wherein:
- the operations further comprise receiving input from a customer device effective to select one or more rules of the access control policy;
- the input overrides a default access control policy; and
- the input defines a scope of authorization of the third party service provider.

13. The non-transitory computer-readable medium of claim 11, wherein the operations further comprise further comprising authenticating the third party service provider based on one or more of success of transport layer security (TLS) communication and on verification of a user identifier (user ID) and password.

14. The non-transitory computer-readable medium of claim 11, wherein the operations further comprise:
- recording customer data communicated to the service provider; and
- prior to communicating requested customer data, evaluating whether, in the aggregate, customer data communicated to the third party service provider along with the requested customer data introduces a privacy issue.

15. The non-transitory computer-readable medium of claim 11, wherein the evaluating includes:
- determining whether disclosure of basic customer data is allowed by the access control policy;
- in response to the disclosure of basic customer data not being allowed by the access control policy, denying the query;
- in response to the disclosure of basic customer data being allowed by the access control policy, determining whether the requested customer data includes only basic customer data;
- in response to the requested customer data including only basic customer data, communicating the requested customer data to the service provider;
- in response to the requested customer data including data other than basic customer data, receiving instructions for accessing external customer data;
- determining whether a link in the instructions is approved;
- in response to the link not being approved, denying the query; and
- in response to the link being approved, accessing the external customer data using the instructions and the basic customer data and communicating the requested customer data to the service provider.

16. The non-transitory computer-readable medium of claim 15, wherein the operations further comprise sanitizing at least a portion of the accessed external customer data.

17. The non-transitory computer-readable medium of claim 16, wherein the sanitizing includes one or more of:
- altering a granularity of the requested customer data;
- redacting basic customer data from the external customer data; and
- parsing the accessed external customer data and extracting only data items involved in analytics performed by the third party service provider for communication to the third party service provider.

18. The non-transitory computer-readable medium of claim 15, wherein the determining whether the link is approved includes:
- comparing the link to a list that includes at least one of whitelisted links and blacklisted links; and
- in response to at least one of the link being one of the whitelisted links and/or not being one of the blacklisted links, approving the link.

19. The non-transitory computer-readable medium of claim 15, wherein the accessing includes communicating one or more dummy requests and an external customer data request to a repository.

20. The non-transitory computer-readable medium of claim 15, wherein the denying includes communicating a deficiency message to the third party service provider indicating a reason for denying the query.

* * * * *